United States Patent
Zehrer et al.

(10) Patent No.: US 10,221,369 B2
(45) Date of Patent: Mar. 5, 2019

(54) PROCESS FOR DESULPHURIZING A GAS MIXTURE

(71) Applicants: Stephan Zehrer, Munich (DE); Jan-Peter Bohn, Starnberg (DE)

(72) Inventors: Stephan Zehrer, Munich (DE); Jan-Peter Bohn, Starnberg (DE)

(73) Assignee: Linde Aktiengesellschaft, Munich (DE)

( * ) Notice: Subject to any disclaimer, the term of this patent is extended or adjusted under 35 U.S.C. 154(b) by 114 days.

(21) Appl. No.: 15/233,151

(22) Filed: Aug. 10, 2016

(65) Prior Publication Data

US 2017/0051218 A1    Feb. 23, 2017

(30) Foreign Application Priority Data

Aug. 18, 2015 (DE) .................. 10 2015 010 756

(51) Int. Cl.

| | |
|---|---|
| *C10K 1/00* | (2006.01) |
| *B01D 53/14* | (2006.01) |
| *C10K 1/08* | (2006.01) |
| *C10K 1/10* | (2006.01) |

(52) U.S. Cl.
CPC .......... *C10K 1/004* (2013.01); *B01D 53/1425* (2013.01); *B01D 53/1462* (2013.01); *C10K 1/005* (2013.01); *C10K 1/085* (2013.01); *C10K 1/10* (2013.01); *B01D 2252/2021* (2013.01); *B01D 2256/16* (2013.01); *B01D 2256/20* (2013.01); *B01D 2256/22* (2013.01); *B01D 2257/304* (2013.01); *B01D 2257/308* (2013.01); *B01D 2257/504* (2013.01); *Y02P 20/152* (2015.11)

(58) Field of Classification Search
CPC .................................................. C10L 2290/541
See application file for complete search history.

(56) References Cited

U.S. PATENT DOCUMENTS

| | | | | |
|---|---|---|---|---|
| 3,245,752 A | * | 4/1966 | Fryar ................. | B01D 53/1456 423/229 |
| 4,568,364 A | * | 2/1986 | Galstaun ............. | B01D 53/14 95/176 |

* cited by examiner

*Primary Examiner* — Matthew J Merkling
(74) *Attorney, Agent, or Firm* — Philip H. Von Neida

(57) ABSTRACT

The invention relates to a process and a device for generating a fuel gas for a gas turbine by separating off sulphur components from a gas mixture containing hydrogen, carbon monoxide, carbon dioxide and also carbonyl sulphide and/or hydrogen sulphide, which gas mixture is in this case scrubbed in a physical gas scrubber with a methanol scrubbing medium at a pressure between 30 and 80 bar(a) in order to obtain a first sulphur-free gas mixture and also a methanol scrubbing medium loaded with sulphur components and carbon dioxide, which methanol scrubbing is then regenerated, wherein a carbon dioxide-rich gas phase that contains sulphur components and is formed by pressure reduction is treated in a further gas scrubber with a methanol scrubbing medium in order to back-wash sulphur components and to generate a second sulphur-free gas mixture.

4 Claims, 2 Drawing Sheets

PROCESS FOR DESULPHURIZING A GAS MIXTURE

CROSS REFERENCE TO RELATED APPLICATIONS

This application claims priority from German Patent Application DE 1020150107569 filed on Aug. 18, 2015.

BACKGROUND OF THE INVENTION

The invention relates to a process for generating a fuel gas for a gas turbine by separating off sulphur components from a feed gas comprising hydrogen, carbon monoxide, carbon dioxide and also carbonyl sulphide and/or hydrogen sulphide, which feed gas is in this case scrubbed in a physical gas scrubber with a methanol scrubbing medium at a pressure between 30 and 80 bar(a) in order to obtain a first sulphur-free gas mixture and also a methanol scrubbing medium loaded with sulphur components and carbon dioxide, which methanol scrubbing medium is then regenerated, wherein a carbon dioxide-rich gas phase that contains sulphur component and is formed by pressure reduction is treated in a further gas scrubber with a methanol scrubbing medium in order to back-wash sulphur components and to generate a second sulphur-free gas mixture.

In addition, the invention relates to a device for carrying out the process according to the invention.

The methanol scrubbing medium used in the physical gas scrubber is technically pure methanol or a mixture of substances predominantly consisting of methanol, which mixture also contains, in particular to improve the scrubbing properties, other substances.

Sulphur-free or desulphurized in the context of the present disclosure is a substance or mixture of substances the sulphur component content of which falls below a preset limiting value. Complete sulphur freedom, which in any case cannot be achieved without considerable expenditure, is not necessary.

Physical gas scrubbers are used to separate off defined components from gas mixtures. They exploit the property of liquids to absorb gaseous substances and keep them physically bound in solution. How well a gas is absorbed by a liquid is expressed by the solubility coefficient which is greater the better the gas dissolves in the liquid. The solubility coefficient generally increases with falling temperature and, according to Henry's absorption law, with increasing pressure.

If a gas component i is to be extracted from a gas mixture by physical gas scrubbing, for this purpose a minimum quantity $W_{min}$ of the liquid used as scrubbing medium is necessary, which quantity may be calculated readily with the following formula:

$$W_{min} = V/(p \cdot \lambda_i)$$

In the formula, V denotes the total amount of the gas mixture, p the pressure prevailing in the gas mixture and $\lambda$ the solubility coefficient of the gas component to be extracted with respect to the scrubbing medium used. Under the assumption that the solubility coefficients of the components of a gas mixture differ sufficiently, by an appropriate adaptation of the amount of scrubbing medium it is possible, in a scrubbing step to separate off the gas component having the greatest solubility coefficient substantially independently of the remaining gas components, i.e. to remove it selectively. The scrubbing medium in this case is loaded with the components that are separated off.

Subsequently to the gas scrubbing, the loaded scrubbing medium is regenerated by removing the dissolved gas components. The regenerated scrubbing medium is usually reused for the gas scrubbing, whereas the gas components that are removed are either disposed of or fed to an economic utilization.

In particular for purifying synthesis gases, gas mixtures which are generated on an industrial scale in gasification plants from coal and/or hydrocarbon-containing feeds, for example by reforming with steam or by partial oxidation, and which generally, in addition to the desired substances hydrogen, carbon monoxide and optionally carbon dioxide, also contain some unwanted constituents such as the sulphur components hydrogen sulphide and carbonyl sulphide, physical gas scrubbers are used. These processes are considered useful, since synthesis gases are now usually generated at high pressure, and the efficacy of physical gas scrubbing increases, to a first approximation, linearly with the operating pressure. Methanol scrubbing is of particular importance for purifying synthesis gases. It exploits the fact that the solubility coefficients of hydrogen sulphide, carbonyl sulphide and carbon dioxide with respect to the methanol scrubbing medium used differ greatly from those of hydrogen and carbon monoxide. Since with falling temperature these differences increase, and thereby the hydrogen losses and carbon monoxide losses by co-absorption decrease, the methanol scrubbing medium is usually introduced into a scrubbing column far below 0° C. and brought into intense contact with the synthesis gas that is to be purified.

If the gas mixture containing hydrogen and carbon monoxide that was generated from the synthesis gas by gas scrubbing is to be fed, for example, to a gas turbine as fuel, it is necessary to attempt to remove the sulphur components as completely as possible, since these firstly would lead to damage of the gas turbine and secondly applicable emission standards in the exhaust gas of the gas turbine must be complied with. At the same time, it is desirable to leave the carbon dioxide virtually completely in the gas mixture, since it is required as a temperature moderator and working medium in the gas turbine. It is prior art to subject the synthesis gas to a single-stage methanol scrubbing in which the minimum amount of unloaded methanol scrubbing medium is used for separating off the sulphur components. In this case, a substantially sulphur-free gas mixture is formed, with, however, markedly decreased carbon dioxide content, since, in addition to the sulphur components, carbon dioxide is also absorbed to a considerable extent by the methanol scrubbing medium.

For the regeneration, the methanol scrubbing medium loaded with sulphur components and carbon dioxide is first expanded to a first pressure in order to desorb co-absorbed hydrogen and co-absorbed carbon monoxide and to increase the yield to recirculate them via a compressor into the synthesis gas. Subsequently, the methanol scrubbing medium is subjected to a hot regeneration, in which a substantially sulphur-free methanol scrubbing medium and also a gas phase comprising sulphur components and carbon dioxide are formed. Since the gas phase is customarily fed to an appliance for sulphur recovery, in which carbon dioxide is only unwanted ballast, it is expedient if it has a sulphur content as high as possible.

For this purpose, a cold regeneration can be connected upstream of the hot regeneration, in which cold regeneration the methanol scrubbing medium which is expanded to the first pressure and cooled in the course of this is further expanded into what is termed an enrichment column to a second pressure situated only slightly above atmospheric pressure, in order to liberate the largest possible fraction of the carbon dioxide present into the gas phase. Sulphur components that are also liberated are backwashed with regenerated methanol scrubbing medium from the gas phase conducted upwards in the enrichment column, in such a manner that a methanol fraction depleted in carbon dioxide content is obtained for passing on to the hot regeneration, and also a carbon dioxide-rich gas phase is obtained which is disposed of as tail gas.

Owing to the low pressure in the enrichment column, the requirement for regenerated methanol scrubbing medium for the backwash of the sulphur components is high. Since, in addition, the low temperatures make liberation of the carbon dioxide more difficult, it is necessary to support the cold regeneration by a stripping, for which purpose, usually nitrogen is introduced as stripping gas into the enrichment column.

According to the prior art, carbon dioxide that is scrubbed out of the synthesis gas is lost with the tail gas in such a manner that the sulphur-free gas mixture obtained by the gas scrubbing, owing to the carbon dioxide content thereof, is ultimately only of limited suitability for use in a gas turbine.

SUMMARY OF THE INVENTION

The object of the present invention is to specify a process of the type in question and also a device to carry it out, which overcome the disadvantages of the prior art.

This object is achieved in that the pressure of the loaded methanol scrubbing medium is reduced to a value between 2.5 and 9 bar(a) and at least a part of the second sulphur-free gas mixture is compressed and combined with the first sulphur-free gas mixture to form the fuel gas for the gas turbine.

By the reduction according to the invention of the pressure of the loaded methanol scrubbing medium to a value which is markedly higher than in processes of the prior art, the efficacy of the sulphur backwashing increases in such a manner that a sought-after degree of sulphur enrichment in the loaded methanol scrubbing medium can be achieved using a smaller amount of methanol scrubbing medium for the scrubbing. Furthermore, the second sulphur-free gas mixture is present at a higher pressure in such a manner that it can be used with a low expenditure on compression for forming the fuel gas for the gas turbine.

The extent of the pressure reduction depends not least on whether a stripping is necessary to achieve the sought-after degree of sulphur enrichment and at what pressure a gas usable for the stripping is available. When stripping is necessary, the pressure reduction proceeds to just beneath the stripping gas pressure. Frequently, stripping gas, such as nitrogen, for example, is available in a sufficient amount only at low-pressure level, i.e. at a pressure between 3 and 9 bar(a), in such a manner that the pressure of the loaded scrubbing medium needs to be correspondingly reduced. If, in contrast, the stripping gas can be used at a medium-pressure level, i.e. at a pressure between 9 and 30 bar(a), a markedly smaller pressure reduction is necessary.

Since the stripping gas used passes together with the carbon dioxide that is stripped off into the second sulphur-free gas mixture, logically, a stripping gas is used which is non-hazardous to the gas turbine in which the fuel gas generated is used. Preferably, nitrogen is used as stripping gas that acts as temperature moderator in the gas turbine and serves for optimizing the turbine operation.

A preferred embodiment of the process according to the invention includes lowering, in exactly one step, the pressure of the methanol scrubbing medium loaded in the scrubbing of the feed gas, in such a manner that hydrogen that is co-absorbed in the scrubbing and co-absorbed carbon monoxide also transfer into the carbon dioxide-rich, sulphur component-containing gas phase. Since hydrogen and carbon monoxide are only dissolved to a small fraction in the backwash of the sulphur components by the methanol scrubbing medium preferably used for this purpose, the co-absorbed substances pass virtually completely into the second sulphur-free gas mixture and thereby into the fuel gas for the gas turbine. Therefore it is possible to dispense with an energetically intense recycling of these substances into the feed gas and nevertheless to achieve a high yield of hydrogen and carbon monoxide.

In a further preferred embodiment of the process according to the invention, the methanol scrubbing medium loaded in the scrubbing of the feed gas is warmed before the pressure thereof is reduced, in order to form the carbon dioxide-rich, sulphur component-containing gas phase. As a result, an increased liberation of carbon dioxide is achieved, in such a manner that it is possible to reduce the amount of stripping nitrogen compared with a process procedure without warming, or even to dispense completely with stripping. Expediently, the warming of the loaded methanol scrubbing medium proceeds against regenerated methanol scrubbing medium that is recirculated, for example, after a hot regeneration, in order to be used again for the gas scrubber.

For the backwashing of the sulphur components from the carbon dioxide-rich, sulphur component-containing gas phase obtained by pressure reduction from the loaded methanol scrubbing medium, completely regenerated sulphur-free methanol scrubbing medium is preferably used, as is also used for scrubbing the feed gas. It is also conceivable, however, to replace the sulphur-free methanol scrubbing medium in whole or in part by a low-sulphur methanol scrubbing medium partly loaded with carbon dioxide, as arises, for example, in the scrubbing of the feed gas. Owing to the dissolved carbon dioxide already present, the partly-loaded methanol scrubbing medium can absorb carbon dioxide less well, as a result of which the selectivity of the sulphur backwash is improved.

If, for scrubbing the feed gas, use is made of a scrubbing column having mass-transfer trays and/or packings arranged one above the other, at the bottom end of which the feed gas that is to be scrubbed is fed, and at the top end of which completely regenerated methanol scrubbing medium is fed, it is provided to withdraw the low-sulphur methanol scrubbing medium partially loaded with carbon dioxide from one of the uppermost mass-transfer trays. If the scrubbing column is constructed with one or more cooling stages arranged one above the other for removal of the heat of solution formed during the gas scrubbing, the partially loaded methanol scrubbing medium is expediently withdrawn immediately after passing through the single or uppermost cooling stage, in such a manner that it can be used without further cooling for backwashing the sulphur components.

In addition, the invention relates to a device for generating a fuel gas for a gas turbine by a physical gas scrubber having a scrubbing appliance in which sulphur components can be separated off from a feed gas containing hydrogen, carbon monoxide, carbon dioxide and also carbonyl sulphide and/or hydrogen sulphide by scrubbing with a methanol scrubbing medium in order to obtain a first sulphur-free gas mixture and also a methanol scrubbing medium loaded with sulphur components and carbon dioxide, and also an enrichment appliance into which the methanol scrubbing medium that is loaded in the scrubbing appliance is expandable via an expansion appliance for enrichment of the sulphur components, and to which the methanol scrubbing medium can be fed in order to subject a carbon dioxide-rich, sulphur component-containing gas phase formed by the expansion to a scrubber to generate a second sulphur-free gas mixture.

In terms of the device, the object in question is achieved in that it has a compressor by which the second sulphur-free gas mixture can be compressed and combined with the first sulphur-free gas mixture to form the fuel gas for the gas turbine.

Preferably, exactly one expansion appliance is arranged between the scrubbing appliance that is operable at a pressure between 30 and 80 bar(a) and the enrichment appliance, via which expansion appliance the loaded methanol scrubbing medium can be expanded in exactly one expansion step to the working pressure of the enrichment appliance situated between 3 and 30 bar(a).

Preferably, the scrubbing appliance and/or the enrichment appliance is constructed as a column having mass-transfer trays and/or packings arranged vertically above one another, as is known from the prior art for use in physical scrubbing appliances.

In addition, preferably the device according to the invention has a heat exchanger, via which the physically acting scrubbing medium that is withdrawable loaded from the scrubbing appliance, before introduction thereof into the enrichment appliance, can expediently be warmed against regenerated methanol scrubbing medium that is to be cooled.

A further variant of the device according to the invention includes a flow connection of the scrubbing appliance to the enrichment column, via which a low-sulphur methanol scrubbing medium that is partially loaded with carbon dioxide can be introduced from the scrubbing appliance for backwashing sulphur components into the enrichment appliance. If the scrubbing appliance is constructed as a column having mass transfer trays, the low-sulphur scrubbing medium partially loaded with carbon dioxide is withdrawable from one of the uppermost mass-transfer trays. If the column is constructed with one or more cooling stages arranged one above the other, the take-off point for the partially loaded methanol scrubbing medium is expediently situated immediately beneath the single cooling stage, or immediately beneath the uppermost cooling stage.

The invention can be advantageously used, in particular, when a sulphur-containing synthesis gas is to be desulphurized exclusively by physical gas scrubbing and at the same time a high carbon dioxide content in the purified synthesis gas and a high degree of enrichment of the sulphur fraction obtained in the gas scrubbing are required.

BRIEF DESCRIPTION OF THE DRAWINGS

Hereinafter, the invention is to be described in more detail with reference to two exemplary embodiments shown schematically in FIGS. 1 and 2.

DETAILED DESCRIPTION OF THE INVENTION

Figure 1:
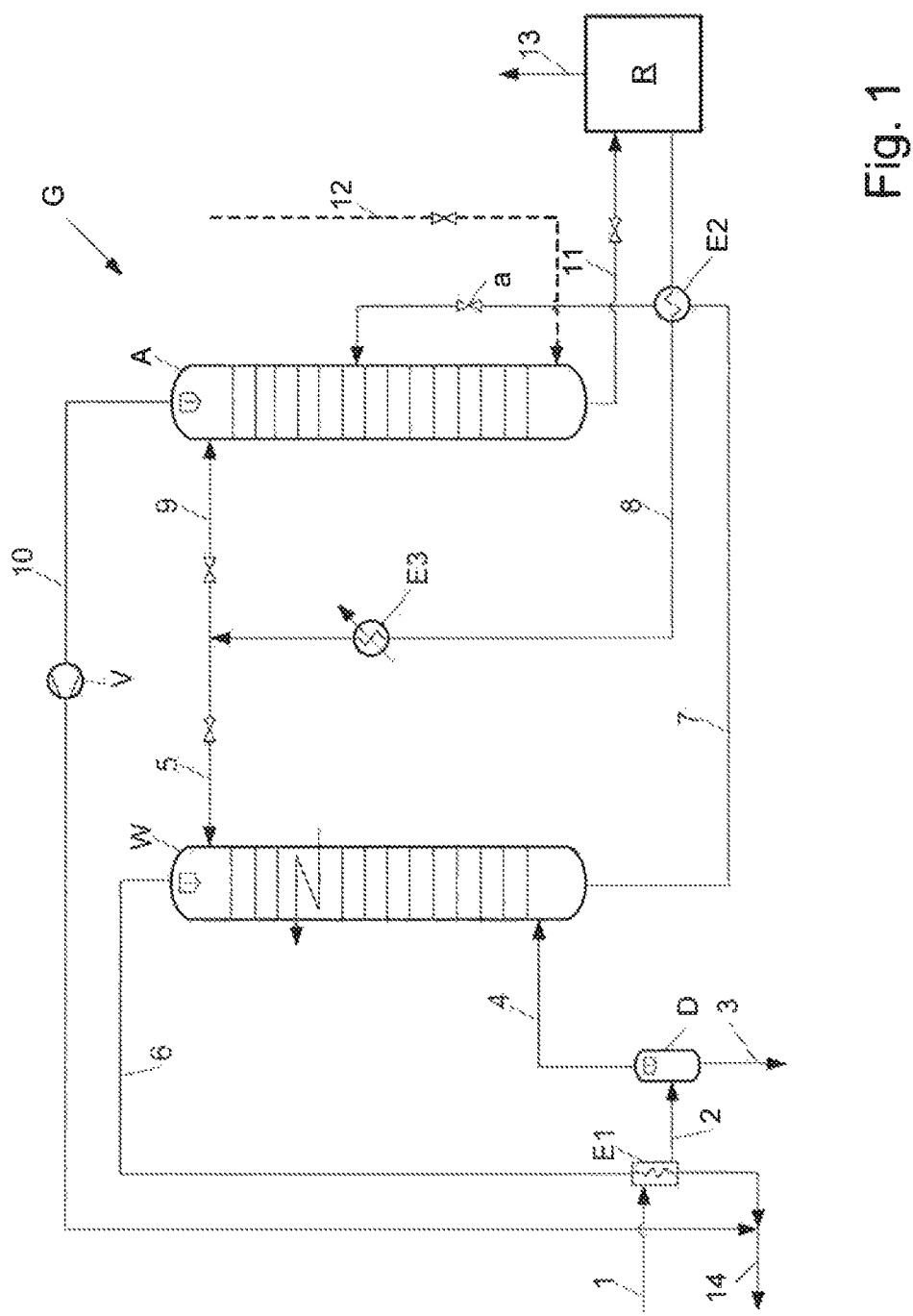
Figure 2:
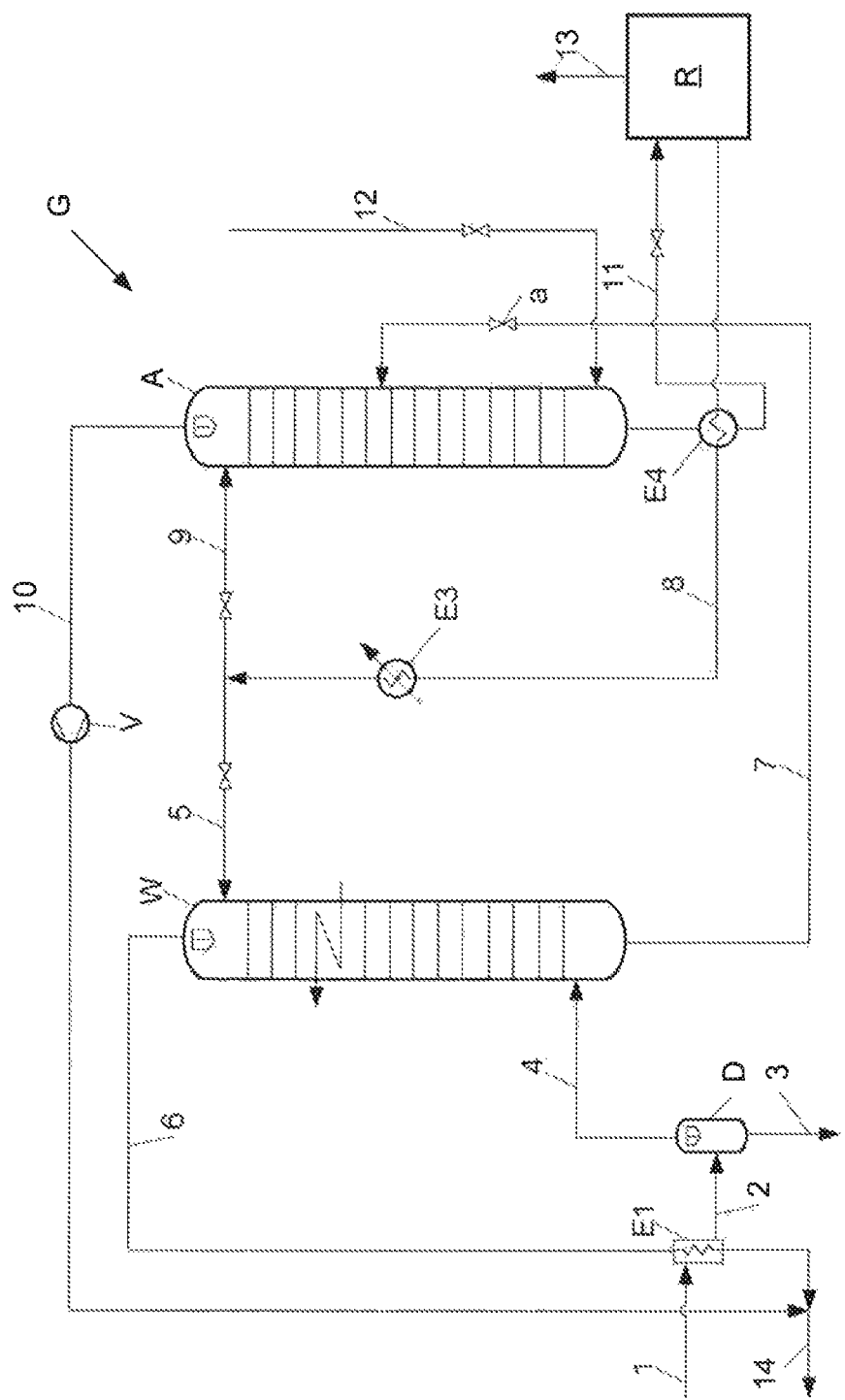

FIGS. 1 and 2 each show the production of a fuel gas for a gas turbine from a synthesis gas, wherein preferred embodiments of the process according to the invention and also of the device according to the invention are used. In both figures, the same plant components and/or process streams are labelled with the same reference signs.

Via line 1, a synthesis gas containing water, hydrogen, carbon monoxide, carbon dioxide and also carbonyl sulphide and/or hydrogen sulphide, which synthesis gas was obtained, for example, by the gasification of coal, is fed to the gas scrubber G. In the cooling in heat exchanger E1, water present is condensed out in such a manner that a two-phase mixture of substances 2 is formed that is separated in the separator D into water 3 and a gas mixture 4 containing the sulphur components.

To separate off the sulphur components, the gas mixture 4 is introduced as feed gas into the lower part of the scrubbing appliance W constructed as a column and operated at a pressure between 30 and 80 bar(a), where it is conducted upwardly and in this case is brought into intensive contact with a methanol scrubbing medium that is fed unloaded to the top of the column via line 5. On the way downwards thereof, the methanol scrubbing medium primarily dissolves sulphur components, but also a part of the carbon dioxide and—to a lower extent—hydrogen and also carbon monoxide out of the feed gas 4, in such a manner that a desulphurized gas mixture 6 can be taken off overhead from the column and a loaded methanol scrubbing medium 7 can be taken off from the column sump. The loaded methanol scrubbing medium 7 is warmed in the heat exchanger E2 before it is expanded via the throttling element a into the enrichment appliance A likewise constructed as a column. During the expansion, the pressure of the loaded methanol scrubbing medium is reduced to a value between 2.5 and 30 bar(a), as a result of which the predominant fraction of the carbon dioxide and hydrogen and carbon monoxide dissolved in the scrubbing medium transfers into the gas phase.

At the top of the enrichment column A, unloaded methanol scrubbing medium 9 is fed in order, during the expansion, to backwash sulphur components that are likewise liberated out of the gas phase, as a result of which a further desulphurized gas mixture 10 and also a methanol scrubbing medium 11 enriched in sulphur content are obtained. On account of the comparatively high operating pressure of the enrichment column A, the methanol scrubbing medium 9 used has an elevated efficacy, in such a manner that markedly less scrubbing medium is required than in the prior art for backwashing the sulphur components. In some circumstances, a required degree of sulphur enrichment cannot be achieved, or can only be achieved with an uneconomically high expenditure, by the described warming and expansion alone. In such a case, a gas 12 that is only poorly soluble in the methanol scrubbing medium is applied to the enrichment column A, in the lower region thereof, which gas 12 is, for example, nitrogen, in order to support the carbon dioxide separation by stripping. The methanol scrubbing medium 11 that is enriched in sulphur content is conducted into the further regeneration part R of the gas scrubber G, where a sulphur-rich gas fraction 13 is separated off, that is suitable as feed for a sulphur production (which is not shown).

Regenerated methanol scrubbing medium 8 is withdrawn unloaded from the regeneration part R and is cooled in the heat exchangers E2 and E3 against loaded methanol scrubbing medium 7 and/or against external cold, before it is divided into the two scrubbing medium streams 5 and 9 and applied to the columns W and A. The pressure of the further sulphur-free gas phase 10 is elevated via the compressor V, before said gas phase 10 is combined to form the substance stream 14 with the first sulphur-free gas mixture 6 that is warmed in the heat exchanger E1 against the feed gas 1 and fed as fuel gas to a gas turbine (which is not shown).

The exemplary embodiment of FIG. 2 differs from that shown in FIG. 1 by the manner of cold recovery.

The methanol scrubbing medium 7 that is loaded in the scrubbing appliance W is expanded via the throttling element a without previous warming, in such a manner that it enters into the enrichment column A at a lower temperature than in the exemplary embodiment of FIG. 1. On account of the lower temperature, a larger amount of stripping gas 12 is required, in order to achieve the same degree of sulphur enrichment in the methanol scrubbing medium 11. For utilization of the cold of the methanol scrubbing medium 11 that is enriched in sulphur content, which methanol scrubbing medium leaves the enrichment column A at a lower temperature than in the exemplary embodiment of FIG. 1, it is cooled in the heat exchanger E4 against a regenerated methanol scrubbing medium 8. This type of cold utilization reduces the requirement of external cold, as a result of which the costs of the increased stripping gas requirement can in some circumstances be compensated for.

The invention claimed is:

1. A process for generating a fuel gas for a gas turbine by separating off sulphur components from a gas mixture comprising hydrogen, carbon monoxide, carbon dioxide and also carbonyl sulphide and/or hydrogen sulphide, which gas mixture is scrubbed in a physical gas scrubber with a methanol scrubbing medium at a pressure between 30 and 80 bar(a) in order to obtain a first sulphur-free gas mixture and also a methanol scrubbing medium loaded with sulphur components and carbon dioxide, which methanol scrubbing medium is then regenerated, wherein a carbon dioxide-rich gas phase that contains sulphur components and is formed by pressure reduction is treated in a further gas scrubber with a methanol scrubbing medium in order to back-wash sulphur components and to generate a second sulphur-free gas mixture, characterized in that the pressure of the loaded methanol scrubbing medium is reduced to a value between 2.5 and 9 bar(a) and at least a part of the second sulphur-free gas mixture is compressed and combined with the first sulphur-free gas mixture to form the fuel gas for the gas turbine, wherein the loaded methanol scrubbing medium is warmed before the pressure thereof is reduced in order to form the carbon dioxide-rich, sulphur component-containing gas phase.

2. The process according to claim 1, characterized in that the pressure of the loaded methanol scrubbing medium, subsequently to the scrubbing of the feed gas, is lowered in exactly one step.

3. The process according to claim 1, characterized in that, for the backwashing of the sulphur components from the carbon dioxide-rich, sulphur component-containing gas phase obtained by pressure reduction from the loaded methanol scrubbing medium, completely regenerated sulphur-free methanol scrubbing medium is used.

4. The process according to claim 1, characterized in that, for backwashing of the sulphur components from the carbon dioxide-rich, sulphur component-containing gas phase obtained by pressure reduction from the loaded methanol scrubbing medium, methanol scrubbing medium partly loaded with carbon dioxide is used.

* * * * *